US012764826B2

(12) United States Patent
Polehn et al.

(10) Patent No.: US 12,764,826 B2
(45) Date of Patent: Oct. 13, 2026

(54) SYSTEM AND METHOD FOR SYNCHRONIZING WI-FI® SIGNALS TO DISCONTINUOUS RECEPTION CYCLES

(71) Applicant: Verizon Patent and Licensing Inc., Basking Ridge, NJ (US)

(72) Inventors: Donna L. Polehn, Mercer Island, WA (US); Mark T. Watts, Newport, RI (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 508 days.

(21) Appl. No.: 18/151,192

(22) Filed: Jan. 6, 2023

(65) Prior Publication Data

US 2024/0237130 A1 Jul. 11, 2024

(51) Int. Cl.
*H04W 76/28* (2018.01)
*H04W 74/0816* (2024.01)

(52) U.S. Cl.
CPC ....... *H04W 76/28* (2018.02); *H04W 74/0816* (2013.01)

(58) Field of Classification Search
CPC .......................... H04W 76/28; H04W 74/0816
See application file for complete search history.

(56) References Cited

U.S. PATENT DOCUMENTS

2012/0051338 A1* 3/2012 Seok ................ H04W 74/0816 370/337
2016/0295630 A1* 10/2016 Gubeskys ............ H04B 7/0456
2018/0027439 A1* 1/2018 Wu ....................... H04W 24/10 370/328
2021/0029750 A1* 1/2021 Xin .................. H04W 74/0816
2024/0040523 A1* 2/2024 Lee ....................... H04W 76/14

* cited by examiner

*Primary Examiner* — Kevin M Cunningham

(57) ABSTRACT

A fixed wireless access device (FWA) comprises a mobile terminal, a Wi-Fi® device; and a processor. The processor is configured to: determine a next active period, for the mobile terminal, within a Discontinuous Reception (DRX) cycle of the mobile terminal; and synchronize an interval of time, for transmission or reception of data at the Wi-Fi® device, to the next active period.

20 Claims, 12 Drawing Sheets

SYSTEM AND METHOD FOR SYNCHRONIZING WI-FI® SIGNALS TO DISCONTINUOUS RECEPTION CYCLES

BACKGROUND INFORMATION

A Fixed wireless access (FWA) device uses radio frequency (RF) waves to forward data to/from consumer devices from/to a wireless network. The FWA device includes a base station-like device and a Wi-Fi® device (e.g., a wireless router, customer premises equipment (CPE), etc.). The base station-like device is connected to a wireless network by a wireless link; and the Wi-Fi® device is part of a local Wi-Fi® network. The Wi-Fi® device allows customer devices to attach to the FWA over Wi-Fi® links and the base station-like device permits the customer devices to access the wireless network through the FWA.

DETAILED DESCRIPTION OF EXAMPLE EMBODIMENTS

The following detailed description refers to the accompanying drawings. The same reference numbers in different drawings may identify the same or similar elements.

Systems and methods described herein relate to synchronizing, in a device, Wi-Fi® signals to Discontinuous Reception (DRX) cycles. As used herein, the term Wi-Fi® may refer to a set of wireless network protocols based on Institute of Electrical and Electronics Engineers (IEEE) 802.11-related standards. More specifically, the protocols relate to wireless connectivity between devices of a local network. Depending on the implementation, a Wi-Fi® network (also referred to simply as Wi-Fi®) may operate at different speeds and in different radio frequency (RF) bands, such as 2.4 GHz (120 mm) or 5 GHz bands. As used herein, the term a "Wi-Fi® device" may refer to a device capable of sending or receiving signals or data over a Wi-Fi® network or a Wi-Fi® link. If a mobile device (e.g., a smart phone) is Wi-Fi® enabled, the mobile device may also be capable of connecting to its broadband network or a cellular network through a Wi-Fi® network or over a Wi-Fi® link.

Figure 1:
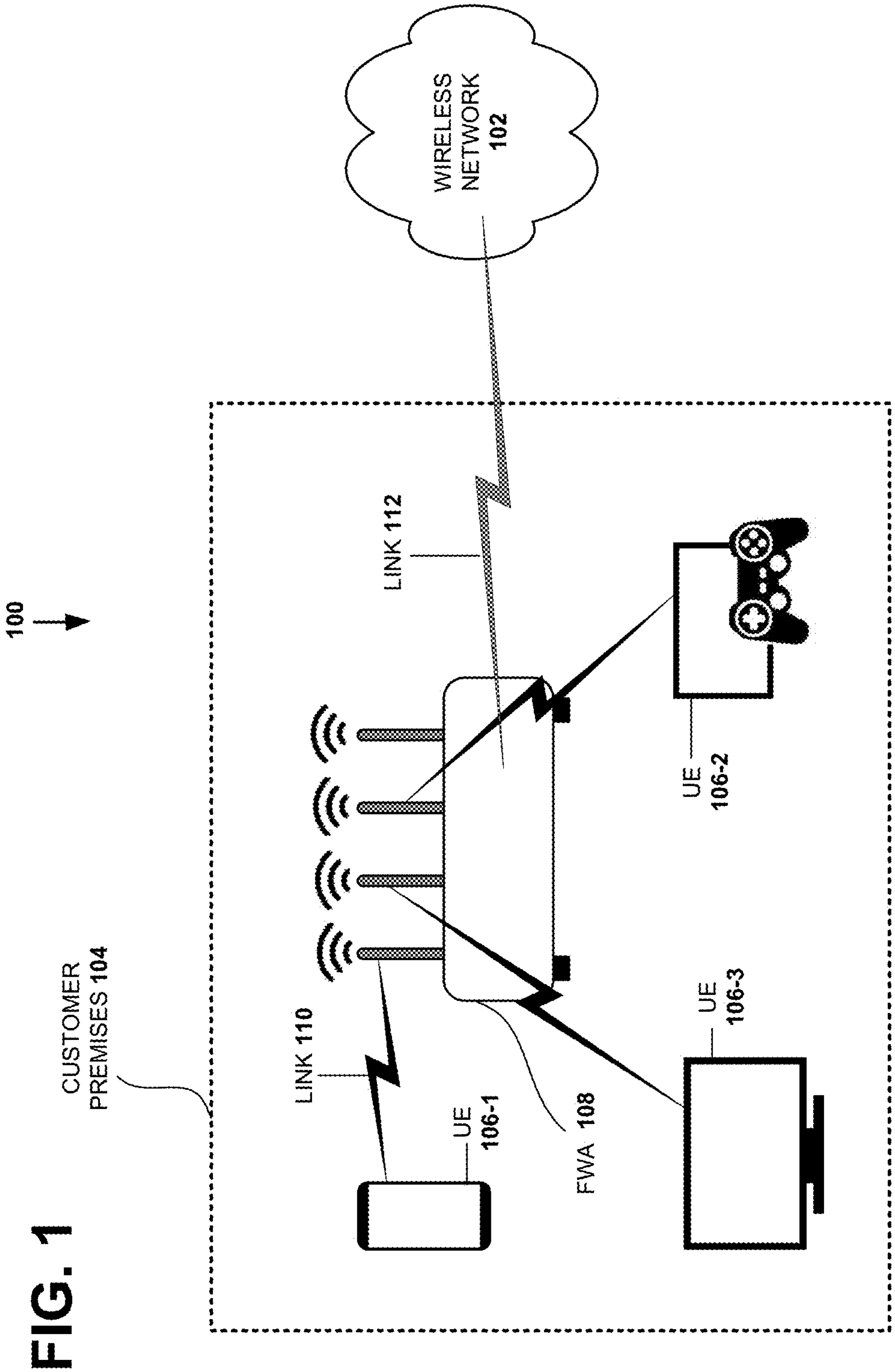
FIG. 1 illustrates concepts described herein.

FIG. 1 illustrates the concepts described herein. As shown, a network environment 100 includes a network 102 and customer premises 104. Network 102 may provide wireless communication services (e.g., cellular network services). Customer premises 104 may include an area that a customer of the Mobile Network Operator (MNO) (also referred to as the service provider) of network 102 occupies. As further shown, customer premises 104 includes various communication devices, such as User Equipment devices (UEs) 106-1, 106-2, and 106-3 (collectively referred to as UEs 106 and generically as UE 106) and a fixed wireless access device (FWA) 108.

UEs 106 may include wireless communication devices capable of both Wi-Fi® communication and cellular communication, such as Fourth Generation (4G) (e.g., Long-Term Evolution (LTE)) communication and/or Fifth Generation (5G) New Radio (NR) communication. Examples of UE 106 include: a smart phone; a tablet device; a wearable computer device (e.g., a smart watch); a global positioning system (GPS) device; a laptop computer; a media playing device; a portable gaming system; an autonomous vehicle navigation system; a sensor, such as a pressure sensor or; and an Internet-of-Things (IOT) device with Wi-Fi® capabilities. In some implementations, UE 106 may correspond to a wireless Machine-Type-Communication (MTC) device that communicates with other devices over a machine-to-machine (M2M) interface, such as LTE-M or Category M1 (CAT-M1) devices and Narrow Band (NB)-IoT devices.

FWA 108 may include a broadband device (e.g., 4G or 5G base station-like device or a mobile terminal for 4G or 5G communication for RF communication with network 102) and a Wi-Fi® device (e.g., a wireless router, customer premises equipment (CPE), tec.). FWA 108 may use the broadband device to communicate with network 102 and use the Wi-Fi® device to communicate with UEs 106.

In FIG. 1, when UEs 106 communicate with other Wi-Fi® devices in customer premises 104, UEs 106 use what is referred to as a Distributed Coordination Function (DCF). The DCF permits the UEs 106 and the Wi-Fi® devices to coordinate their communications with one another without being centrally managed. In contrast, network 102 is mostly centrally managed. The different degrees of centralization in network 102 and the Wi-Fi® network can lead to issues at UEs 106 when UEs 106 attach to FWA 108 over Wi-Fi® channels and access network 102 through FWA 108.

For example, assume that the user of UE 106-1 is subscribed to a FWA service at network 102; and that FWA 108 has an ultra-low latency (ULL) connection to network 102 over a link 112, with about 5 ms latency and 500 Mbps throughput. When UE 106-1 accesses FWA 108 over a Wi-Fi® link 110, however, the user of UE 106-1 discovers that UE 106-1 is only getting 110 ms latency and 200 Mbps throughput over link 112 due to contention-caused congestion in the Wi-Fi® network. The systems and methods described herein address such issues, by synchronizing Wi-Fi® signals to patterns of cellular signals from FWA 108 (or more generally a gateway between the Wi-Fi® network and network 102) to network 102.

According to the systems and methods, a gateway device (e.g., FWA 108) between a Wi-Fi® network and a provider network (e.g., a cellular network) includes synch logic that the user can enable for communicating with selected Wi-Fi® devices or selected UEs 106. When enabled, the logic in the gateway device synchronizes Wi-Fi® signals on the Wi-Fi® side of the gateway device with wireless signals on the network 102 side of the gateway device. More specifically, the synch logic is configured to use a feature of Wi-Fi® network, previously referred to as a DCF, to synchronize the Wi-Fi® network to particular signaling patterns, of communication between the gateway device and network 102, which are referred to as Discontinuous Reception (DRX) cycles.

Figure 2:
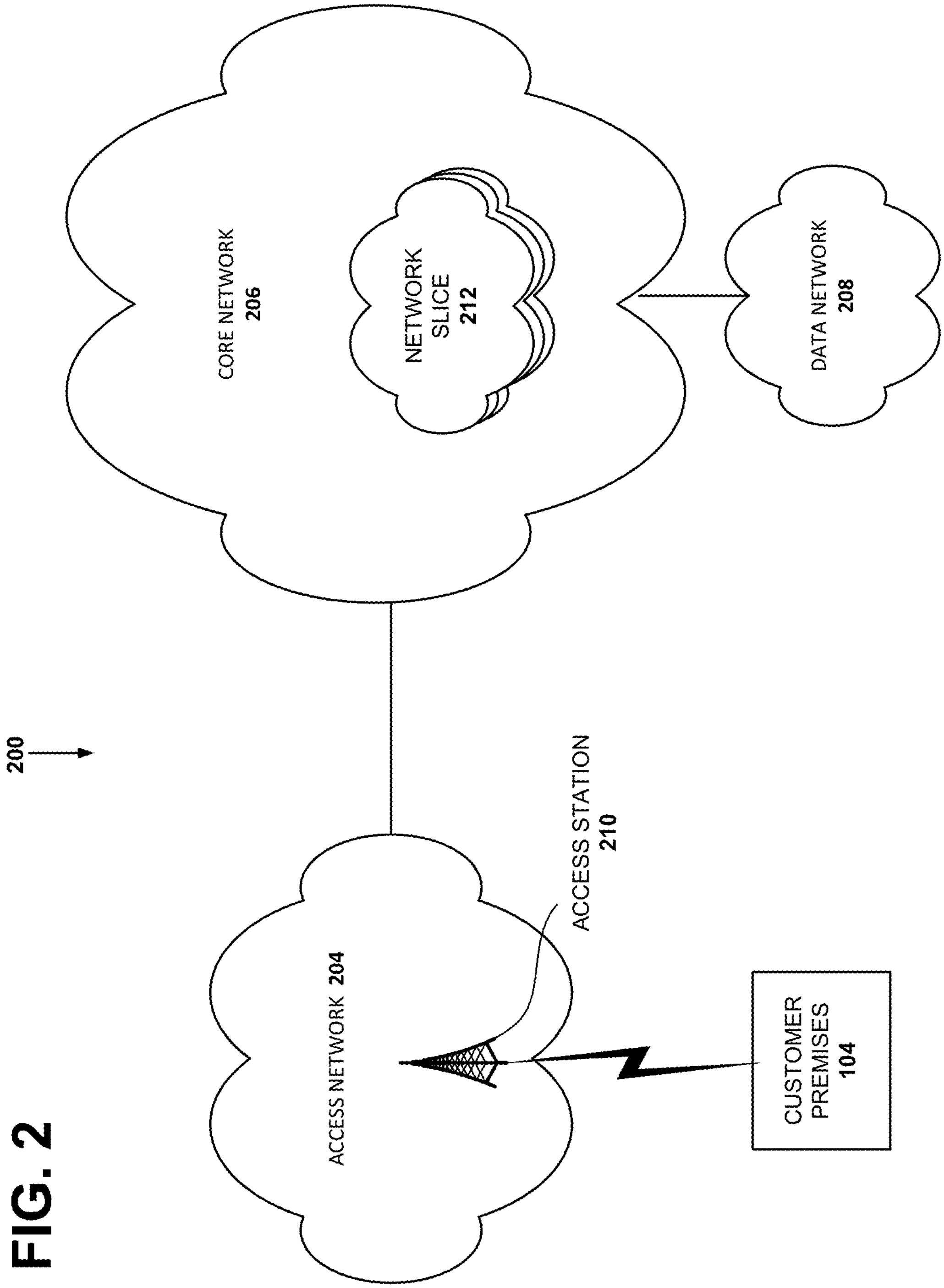
FIG. 2 illustrates an exemplary network environment in which systems and methods described herein may be implemented.

FIG. 2 illustrates an exemplary network environment 200 in which the system and methods described herein may be implemented. As shown, environment 200 may include customer premises 104, an access network 204, a core network 206, and a data network 208. Access network 204, core network 206, and data network 208 may be part of network 102 of FIG. 1. Referring to FIG. 2, customer premises 104, as already described, may include a physical area which a customer of the service provider may occupy. Customer premises 104 may include a gateway device (e.g., FWA 108) and UEs 106.

Access network 204 may allow or customer devices (e.g., devices in customer premises 104, such as UEs 106 or FWA 108) to access core network 206. To do so, access network 204 may establish and maintain, with participation from the customer devices, an over-the-air channel with the customer devices; and maintain backhaul channels with core network 206. Access network 204 may relay information through these channels, from the customer devices to core network 206 and vice versa. Access network 204 may include an LTE radio network and/or a 5G NR network, or other advanced radio network. These networks may include many central units (CUs), distributed units (DUs), radio units (RUS), and wireless stations, one of which is illustrated in FIG. 2 as access station 210 for establishing and maintaining over-the-air channel with the customer devices. Access station 210 may include a 4G, 5G, or another type of base station (e.g., eNB, gNB, etc.) that comprises one or more RF transceivers. In some implementations, access station 210 may be part of an evolved Universal Mobile Telecommunications Service (UMTS) Terrestrial Network (eUTRAN).

Core network 206 may include one or more devices and network components for providing communication services to customer devices. For example, core network 206 may permit the customer devices to attach to network 102, establish sessions with devices in network 102, and/or receive services from network 102 (e.g., receive content, access the Internet, conduct video conferences with another customer device attached to network 102, etc.). To deliver various services, core network. 206 may interface with other networks, such as data network 208.

Depending on the implementation, core network 206 may include 5G core network components (e.g., a User Plane Function (UPF), an Application Function (AF), an Access and Mobility Function (AMF), a Session Management Function (SMF), a Unified Data Management (UDM) function, a Unified Data Repository (UDR), a Network Slice Selection Function (NSSF), a Policy Control Function (PCF), etc.); 4G or LTE core network components (e.g., a Serving Gateway device (SGW), a Packet data network Gateway device (PGW), a Mobility Management Entity (MME), etc.); and/or other types of core network components.

When core network 206 is implemented as a 5G network, core network 206 may include network slices 212. Network slices 212 may be instantiated as a result of "network slicing," which involves a form of virtual network architecture that enables multiple logical networks to be implemented on top of a shared physical network infrastructure using software defined networking (SDN) and/or network function virtualization (NFV). Each logical network, referred to as network slice 212, may encompass an end-to-end virtual network with dedicated storage and/or computational resources that include access network components, clouds, transport, Central Processing Unit (CPU) cycles, memory, etc. Furthermore, each network slice 212 may be configured to meet a different set of requirements and be associated with a particular Quality of Service (QOS) class, a type of service, and/or a particular group of enterprise customers associated with FWAs and/or mobile communication devices.

Data network 208 may include one or more networks connected to core network 206. In some implementations, a particular data network 208 may be associated with a data network name (DNN) in 5G and/or an Access Point Name (APN) in 4G. A customer device may request a connection to data network 208 using a DNN or APN. Data network 208 may include, and/or be connected to and enable communication with a local area network (LAN), a wide area network (WAN), a metropolitan area network (MAN), an autonomous system (AS) on the Internet, an optical network, a cable television network, a satellite network, another wireless network (e.g., a Code Division Multiple Access (CDMA) network, a general packet radio service (GPRS) network, and/or an LTE network), an ad hoc network, a telephone network (e.g., the Public Switched Telephone Network (PSTN) or a cellular network), an intranet, or a combination of networks. Data network 208 may include an application server (also simply referred to as application). An application may provide services for a program or an application running on UEs 106 and may establish communication session with UEs 106 via core network 206.

For clarity, FIG. 2 does not show all components that may be included in network environment 200 (e.g., routers, bridges, wireless access point, additional networks, additional customer premises. etc.). Depending on the implementation, network environment 200 may include additional, fewer, different, or a different arrangement of components than those illustrated in FIG. 2. Furthermore, in different implementations, the configuration of network environment 200 may be different.

Figure 3A:
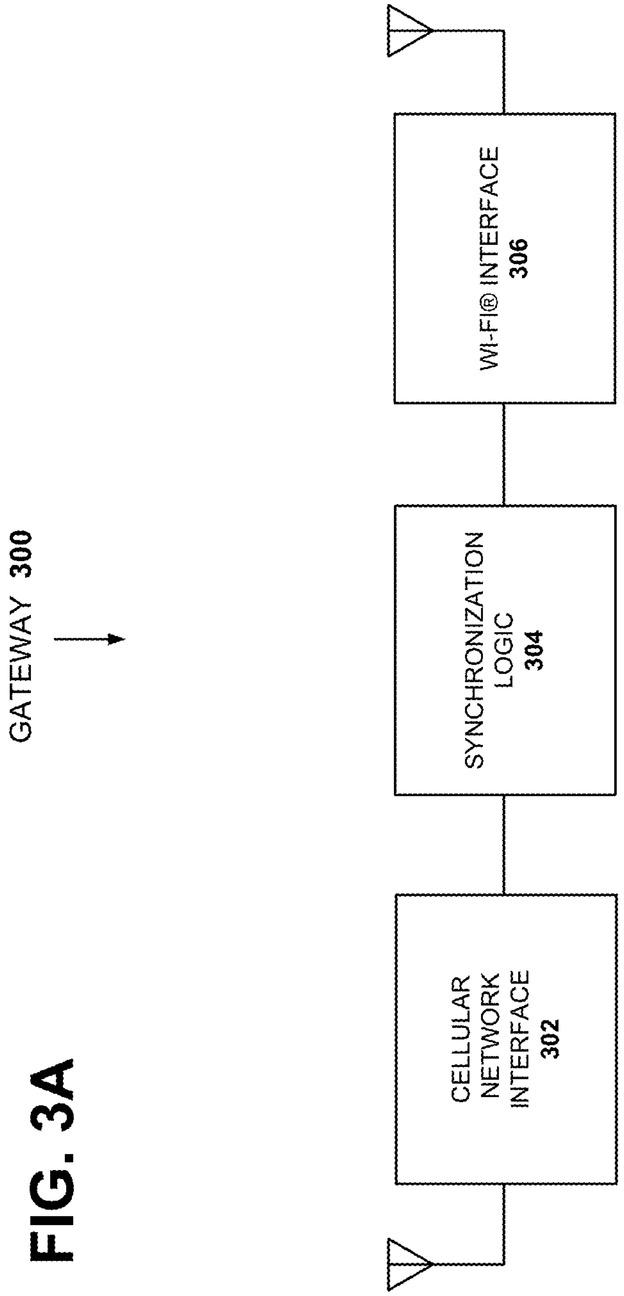
FIG. 3A illustrates example components of a gateway device, according to an implementation.

FIG. 3A illustrates exemplary components of a gateway device 300 in customer premises 104. In some embodiments, gateway device 300 may be implemented as FWA 108. Gateway device 300 acts as a middleman between access network 204 in network 102 and the Wi-Fi® network in customer premises 104. As shown, gateway device 300 may include a cellular network interface 302, synchronization logic 304, and Wi-Fi® interface 304. Depending on the embodiment, the system may include different set of network components than those illustrated in FIG. 3A. For example, each of cellular network interface 302, synchronization logic 304, and Wi-Fi® interface 304 may be part of separate devices or components (e.g., a mobile terminal, a processor, and Wi-Fi® device).

Cellular network interface 302 may include a component that acts like a base station or as a mobile terminal (MT). The mobile terminal-like component may implement functions for attaching to access network 204, establishing a session with core network 206 over access network 204, and/or receiving services from network 102. In particular, cellular network interface 302 may be capable of coordinating with access network 204 to transmit and/or receive signals in accordance with a set of timing patterns, previously referred to as DRX cycles, used by devices for saving battery power. Roughly, each DRX cycle specifies an active phase, an interval during which a mobile terminal (e.g., gateway device 300) is or should be in an active mode, and a sleep phase, an interval during which the mobile terminal is or should be in a sleep mode or an inactive mode. Cellular network interface 302 may set or determine one or more values of parameters of DRX cycles and provide the parameter values to synchronization logic 304. Synchronization logic 304 may synchronize Wi-Fi® signals to/from gateway device 300 with DRX cycles, such that communications with a particular Wi-Fi® device in the Wi-Fi® network occurs during active phases of DRX cycles. Synchronization logic 304 is described below in greater detail with reference to FIG. 3B.

Wi-Fi® interface 306 provides parameter values that are associated with Wi-Fi® signaling to synchronization logic 304, receives requests from synchronization logic 304 to issue Wi-Fi® signals, and transmits such signals. Wi-Fi® interface 306 may transmit Wi-Fi® signals in accordance with IEEE 802.11 protocols. In particular, Wi-Fi® interface 806 may implement the IEEE 802.11 DCF, which is described below in greater detail with reference to FIG. 4D.

Figure 3B:
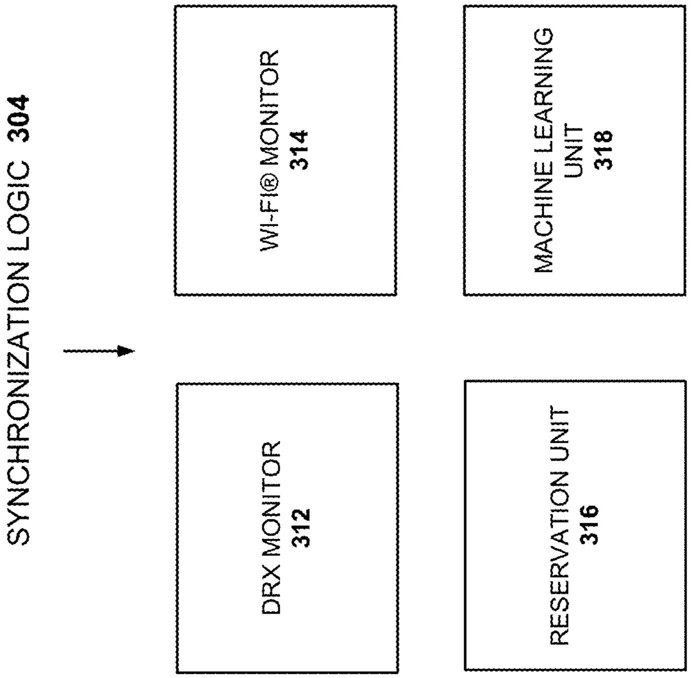
FIG. 3B shows example components of synchronization logic, according to an implementation.

FIG. 3B shows exemplary components of synchronization logic 304, according to an implementation. As shown, synchronization logic 304 may include a DRX monitor 312, a Wi-Fi® monitor 314, a reservation unit 316, and machine learning (ML) unit 316. In other implementations, synchronization logic 304 may include additional, fewer, or different components than those illustrated in FIG. 3B.

DRX monitor 312 may obtain DRX parameters from cellular network interface 302 and provide the parameters to reservation unit 316. When gateway device 300 powers up, gateway device 300 may be in a state known as the Radio Resource Control (RRC) idle state. When gateway device 300 registers with network 102 and attaches to access network 204, gateway device 300 enters the RRC connected state. In the RRC idle state, gateway device 300 may be paged from network 102. In the RRC connected state, gateway device 300 has an RRC connection with access network 204 for communication. In either the RRC idle state or the RRC connected state, gateway device 300 may enter or perform DRX cycles.

Figure 4A:
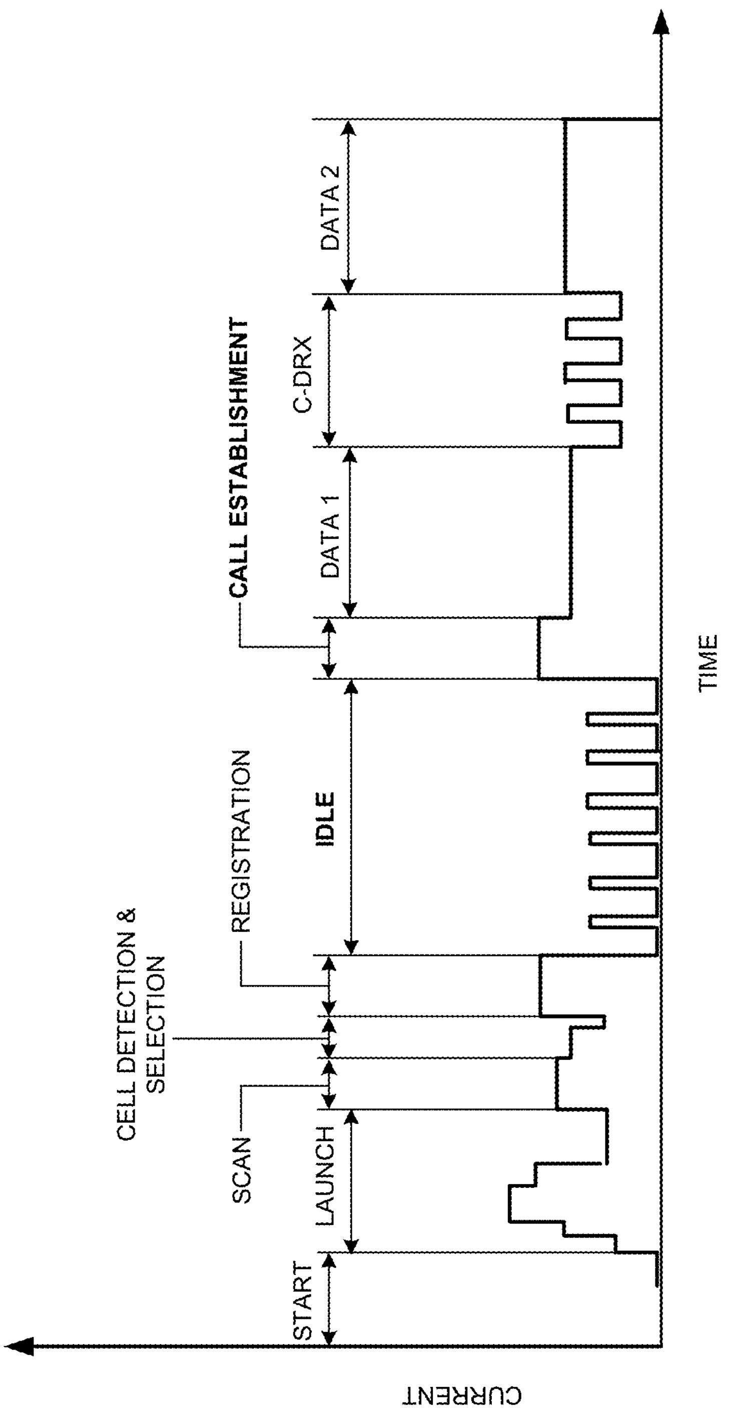
FIG. 4A illustrates example activities of a gateway device and discontinuous reception (DRX) cycles, according to an implementation.

FIG. 4A illustrates example activities of gateway device 300 (as indicated by different levels of current consumption) and corresponding DRX cycles. As shown, gateway device 300 may START, then LAUNCH its applications, SCAN for broadcast signals, and perform CELL DETECTION and SELECTION. Next, gateway device 300 may perform REGISTRATION. Gateway device 300 so far has been the RRC idle state. As gateway device 300 is not connected to access network 204, gateway device 300 is in the RRC idle state. With the CALL ESTABLISHMENT, however, gateway device 300 enters the RRC connected state, during which gateway device 300 transmits data (e.g., "DATA 1," "DATA 2," etc.). Depending on whether gateway device 300 is in the RRC idle state or in the RRC connected state, gateway device 300 may perform different types of DRX cycles.

During the RRC idle state, gateway device 300 may execute an idle-mode DRX (I-DRX or IDRX, not shown). When gateway device 300 is about to perform or is performing the IDRX, DRX monitor 312 may obtain IDRX parameter values and provide the parameter values to reservation unit 316. The IDRX parameters may include, for example, the next paging frame time, the next paging subframe time (or the paging occasion time), and the next wake-up time, and the next sleep time.

Figure 4B:
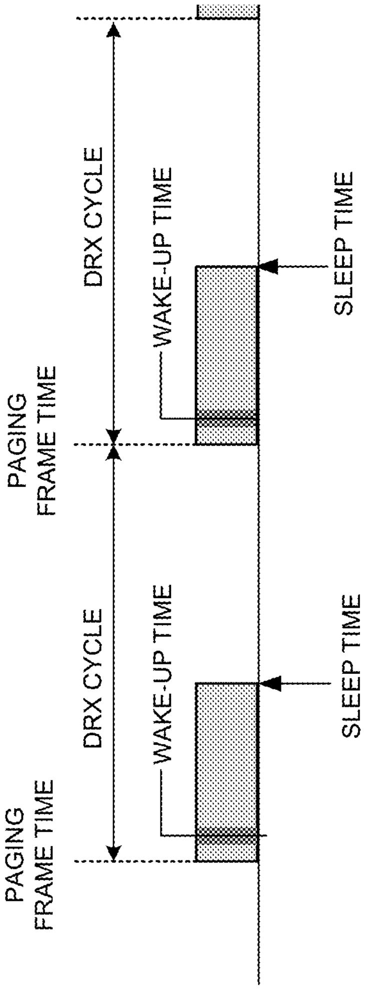
FIG. 4B shows example idle mode DRX cycles and corresponding parameters.

FIG. 4B shows an example of IDRX cycles and corresponding IDRX parameters. Referring to FIG. 4B, the next paging frame time designates the arrival time of the frame in which gateway device 300 will awake. The next paging subframe time specifies the arrival time of the subframe, within the next paging frame, in which the gateway device 300 will become awake to scan the physical downlink control channel (PDCCH) in the broadcast signal from access station 210. The next wake-up time may specify the time, in the next paging subframe, at which gateway device 300 becomes awake. The next sleep time specifies the arrival time of the moment at which gateway device 300 is to enter the RRC sleep mode.

During the RRC connected state, gateway device 300 may execute a connected-mode DRX (C-DRX or CDRX). When gateway device 300 is about to perform or is performing the CDRX, DRX monitor 312 may obtain CDRX parameter values and provide the parameter values to reservation unit 316, In one implementation, the parameters may relate to what is referred to as a long CDRX cycle. The parameters which relate to the long CRX cycle may include the next on time, the on-duration, the inactivity period, and the next inactivity time.

Figure 4C:
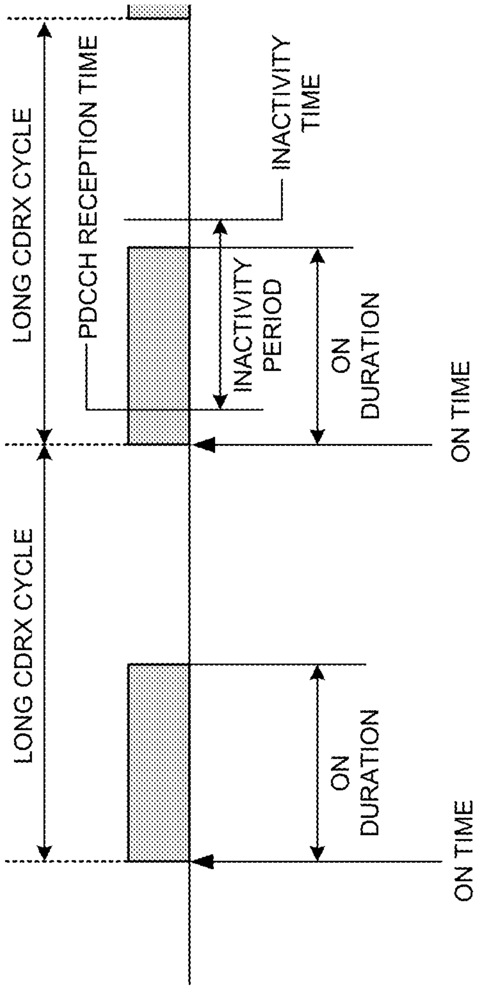
FIG. 4C shows example connected mode DRX cycles and corresponding parameters.

FIG. 4C shows an example of long CDRX cycles and CDRX parameters. Referring to FIG. 4C, the on time specifies the time at which gateway device 300 can scan a PDCCH in the radio frame. The on-duration or on-duration window refers to the minimum duration of time, after the on time, for which gateway device 300 is active. The on-duration window may occupy a fraction of the long CDRX cycle duration. The inactivity period specifies the amount of time that is to elapse, just after detecting and scanning the PDCCH (the scanning is performed within the on-duration window), before gateway device 300 enters the sleep state or the inactive state. The inactivity time specifies the time at which gateway device 300 enters the inactive state.

Figure 4D:
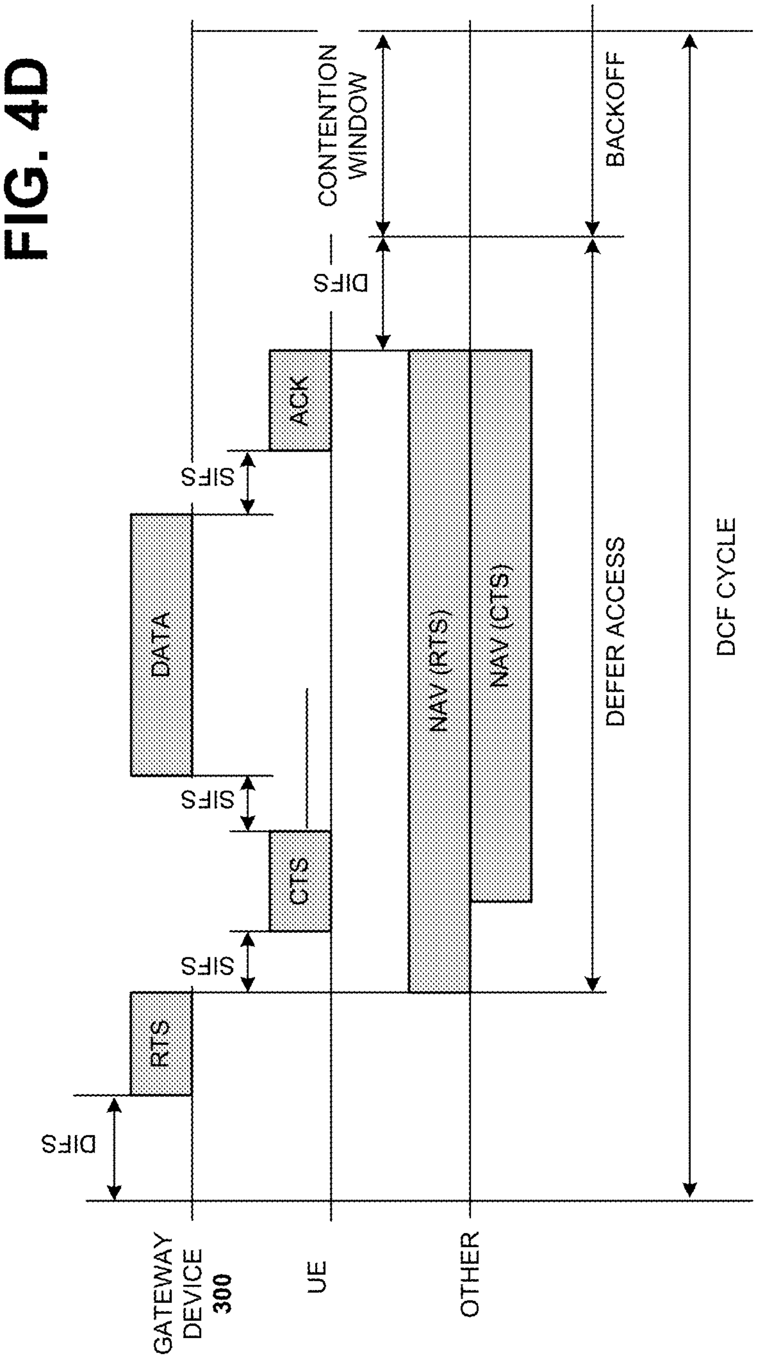
FIG. 4D shows example Wi-Fi® signals between a gateway device and a User Equipment device (UE), according to an implementation.

Referring back to FIG. 3B, Wi-Fi® monitor 314 may receive commands from reservation unit 316 to issue Wi-Fi® signals in synchrony with long DRX cycles. FIG. 4D illustrates Wi-Fi® signals between gateway device 300 and UE 106. As shown, to reserve a channel with UE 106-1 (or acquire the Wi-Fi® channel to communicate with UE 106-1), gateway device 300 may issue a Request to Send (RTS) message to UE 106-1. UE 106-1 responds with a Clear to Send (CTS) message, after which gateway device 300 sends data. When the data transmission terminates, UE 106-1 responds with an acknowledgment (ACK) message. As shown, between the messages, there is a delay, referred to as a short interframe space (SIFS).

When Wi-Fi® monitor 314 receives a command from reservation unit 316 to acquire or reserve the Wi-Fi® channel, Wi-Fi® monitor 314 may drive gateway device 300 to transmit the RTS message and receive the CTS message from UE 106-1. In addition, Wi-Fi® monitor 314 may cause gateway device 300 to generate a Network Allocation Vector (NAV) signal following the RTS message. Gateway device 300 may continue to transmit the NAV signal until the UE 106 sends the ACK message. While the NAV signal is present in the Wi-Fi® channel, the other devices on the Wi-Fi® network deter their attempts to send or receive data. Accordingly, in FIG. 4D, after gateway device 300 sends an RTS message to UE 106-1 and is transmitting the NAV signal, UEs 106-2 and 106-3 defer transmitting data. That is, on the Wi-Fi® network, communication occurs between gateway device 300 and UE 106-1 that have exchanged RTS and CTS messages. The combination of an RTS message, the DATA, and the ACK message, together with the NAV signals form a Wi-Fi® communication cycle, also referred to as a DCF cycle. As shown in FIG. 4D, the DCF cycle may include: a first DCF interframe space (DIFS) that precedes the RTS message; a second DIFS that follows the NAV signals; and a contention window that follows the second DIFS.

In addition to causing gateway device 300 to issue an RTS message for synchronizing Wi-Fi® signals to long CDRX cycles, Wi-Fi® monitor 314 may obtain Wi-Fi®-related parameters and provide them to reservation unit 316, periodically or on demand. Examples of the parameters include: a Wi-Fi® channel traffic volume; a Wi-Fi® channel bandwidth; and a time-to-acquisition, which includes a time interval between the time when gateway device 300 transmits a first RTS message to attempt to acquire the Wi-Fi® channel and the time when gateway device 300 successfully acquires the channel (i.e., the time when gateway device 300 generates a NAV signal).

Wi-Fi® monitor 314 may determine the Wi-Fi® parameter values in various ways. For example, Wi-Fi® monitor may determine the Wi-Fi® traffic volume by determining the average number of packets/frames passing through gateway device 300. In another example, Wi-Fi® monitor 314 may have stored various device parameters of gateway device 300 (e.g., a link bandwidth) and provide one or more of such parameters when requested by reservation unit 316. In yet another example, Wi-Fi® monitor 314 may obtain the time-to-acquisition value by: recording the initial time at which gateway device 300 issues a first RTS message to attempt to acquire the channel; recording the time-of-acquisition at which gateway device 300 generates a NAV signal after transmitting a collision-free RTS message; and computing the time-to-acquisition by subtracting the initial time from the time-of-acquisition. If the first RTS message and the collision-free RTS message are the same RTS message, then the time-to-acquisition is equal to the size of a SIFS.

Depending on whether the first RTS results in a Wi-Fi® channel acquisition, the time-to-acquisition may or may not be equal to the size of a SIFS. In trying to send data to UE 106-1, gateway device 300 uses a contention window to compete with other Wi-Fi® devices to acquire the Wi-Fi® channel. If gateway device 300 succeeds in acquiring the Wi-Fi® channel, the other Wi-Fi® devices deter their data transmissions.

Alternatively, if gateway device 300 is unable to acquire the channel within its contention window because its RTS message collides with other RTS messages (e.g., the RTS messages from the other Wi-Fi® devices overlap in time with the RTS message), gateway device 300 increases the size of its contention window and reattempts to acquire the channel in the enlarged contention window. Gateway device 300 may repeat the process until gateway device 300 succeeds in acquiring the Wi-Fi® channel.

Depending on the implementation, gateway device 300 may increase the size of its contention window in response to a RTS collision in various ways. For example, gateway device 300 may increase the size of its contention window as a linear function of the number of preceding consecutive RTS collisions. For example, if gateway device 300 attempted to transmit an RTS message 4 times (after a wait time after each RTS message transmission), the next contention window may have the size of 5. That is, window size=number of preceding consecutive collisions+1. In another example, gateway device 300 may increase the size of its contention window after an RTS collision in accordance with the binary exponential back-off algorithm. According to the algorithm, the size of contention window is doubled after an RTS collision.

Referring back to FIG. 3B, reservation unit 316 may be configured to synchronize Wi-Fi® signals to a long CDRX cycle by changing the timing of Wi-Fi® signals. In particular, reservation unit 316 may request Wi-Fi® monitor 314 to transmit an RTS message that results in a Wi-Fi® channel acquisition.

To acquire the Wi-Fi® channel, gateway device 300 needs to send an RTS message that does not collide with other RTS messages in the Wi-Fi® channel. If the RTS message sent by gateway device 300 does collide with another RTS message, gateway device 300 will transmit a second RTS message; if the second RTS message collides with other RTS messages, gateway device 300 will transmit a third RTS; and so on until gateway device 300 acquires the Wi-Fi® channel.

Figure 4E:
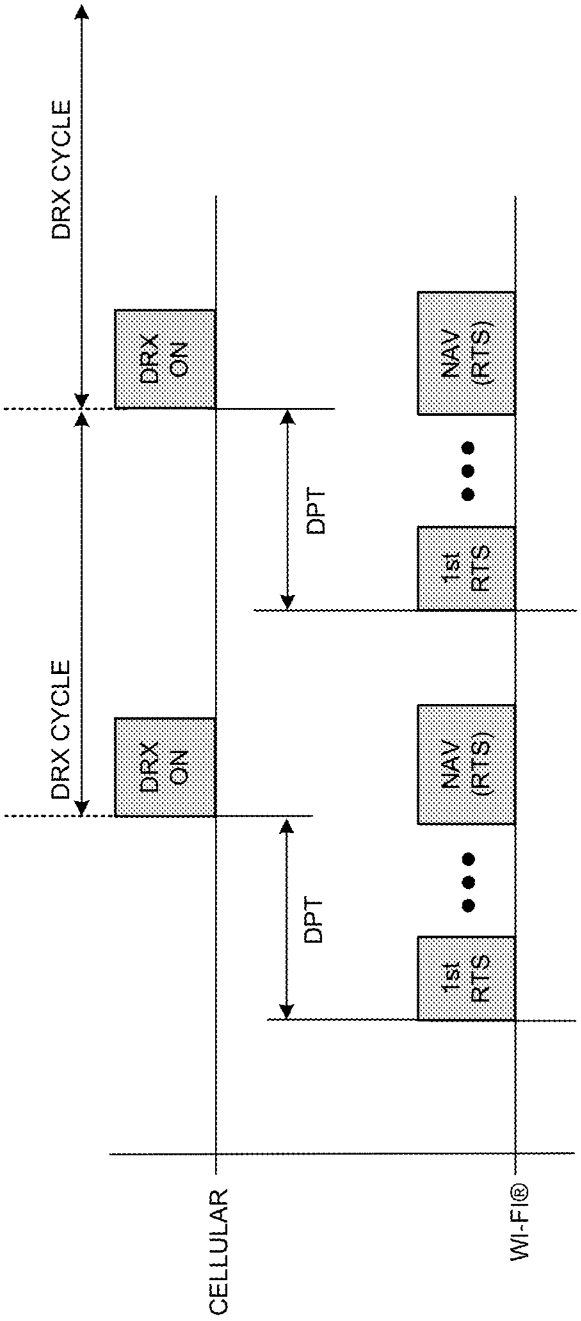
FIG. 4E illustrates example synchronization between Wi-Fi® signals and long connected-mode DRX (CDRX) cycles, according to an implementation.

FIG. 4E illustrates the above-described behavior of gateway device 300. As shown on the lower portion of FIG. 4E, a $1^{st}$ RTS message is sent by gateway device 300. FIG. 4E also shows that whether there are collisions or not, gateway device 300 eventually acquires the Wi-Fi® channel and generates a NAV signal.

Prior to sending a $1^{st}$ RTS message for Wi-Fi® channel acquisition, reservation unit 316 chooses a time, herein referred to as a DRX precede time (DPT), which specifies the time of transmission of the $1^{st}$ RTS message relative to the next on time of a long CDRX cycle. The DPT is chosen so that, after the $1^{st}$ RTS message is transmitted at the chosen DPT, gateway device 300 may acquire the Wi-Fi® channel with a particular probability before the on time of the long CDRX cycle. FIG. 4E illustrates how such synchronization occurs between Wi-Fi® signals and long CDRX cycles. As shown, gateway device 300 issues a $1^{st}$ RTS message each time gateway device 300 is to communicate with a UE 106, with a DPT such that the NAV signal occurs in synchrony with an on-duration of a long CDRX cycle. In FIG. 4E, although each NAV is illustrated as occurring slightly prior to the front edge of each on-duration window and extending throughout the on-duration window, the NAV signal may not actually be issued before or after the DPT—since a Wi-Fi® channel acquisition is a stochastic event.

Returning to FIG. 3B, to select a DPT to synch the Wi-Fi® network to a long CDRX with a particular probability, reservation unit 316 may employ graphs or tables of DPTs that resulted in a Wi-Fi® channel acquisition at various congestion levels. Reservation unit 316 may obtain the graphs by collecting CDRX parameter values via DRX monitor 312 and Wi-Fi® parameters via Wi-Fi® monitor 314. For example, reservation unit 316 may obtain the time-to-acquisition and congestion levels from Wi-Fi® monitor 314, the on times of CDRX from DRX monitor 312, etc. Using the parameters, reservation unit 316 may compute the probabilities of Wi-Fi® channel acquisition, determine DPTs at a congestion level using the probabilities and the on times of a long CDRX, etc. Reservation unit 316 may store the collected parameter values and the computed values as graphs or tables. If a user specifies a particular probability of channel acquisition, reservation unit 316 may look up a DPT corresponding to the current congestion level and the specified probability.

Figure 5:
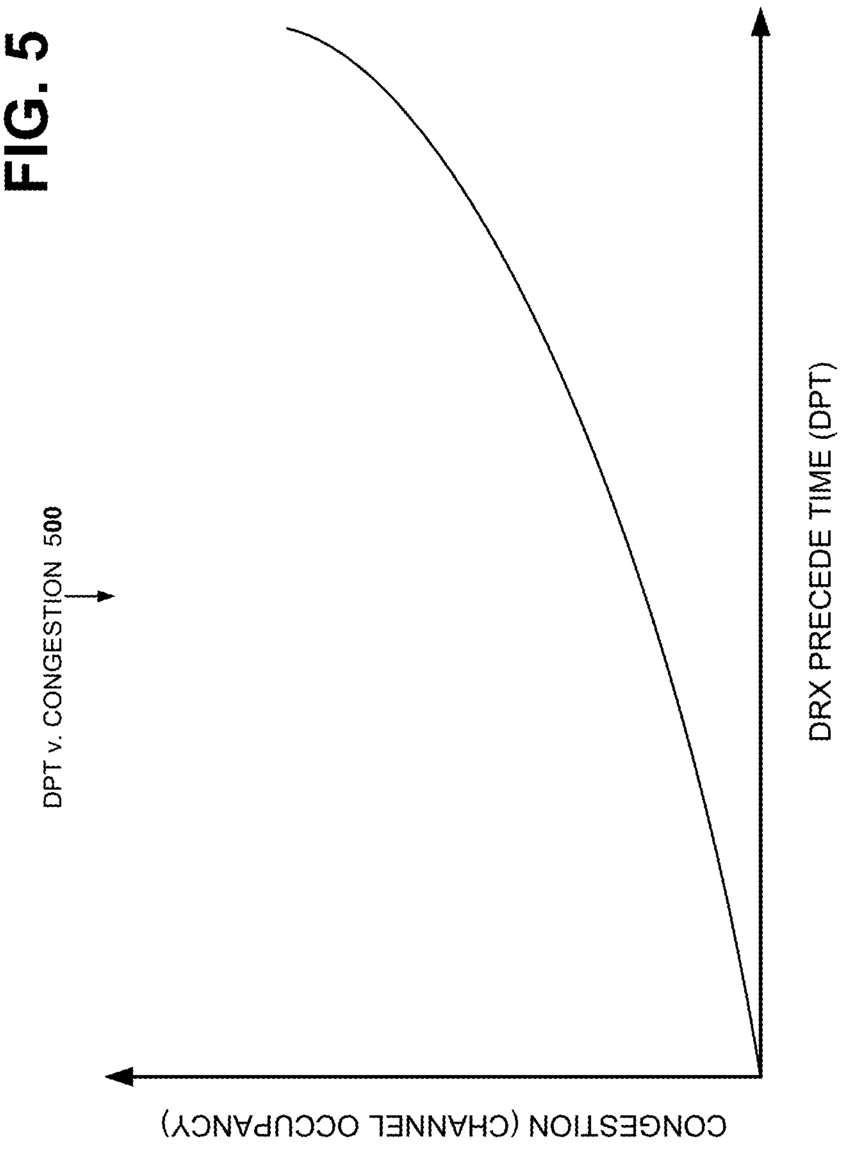
FIG. 5 shows an exemplary plot of network congestion as a function of a DRX precede time (DPT) necessary to acquire a Wi-Fi® channel with a particular probability, according to an implementation.

FIG. 5 shows an exemplary plot 500 of network congestion as a function of DPT necessary to acquire a Wi-Fi® channel with a particular probability, according to an implementation. Reservation unit 316 may store many such graphs, as tables, and use the tables as needed to determine a DPT. As shown, as congestion (measured as channel occupancy, collisions per unit time, etc.) increases, a larger DPT is required to acquire the Wi-Fi® channel. A greater congestion requires a larger DTP to acquire the Wi-Fi® channel because the probability of collision increases with increasing congestion.

Figure 6:
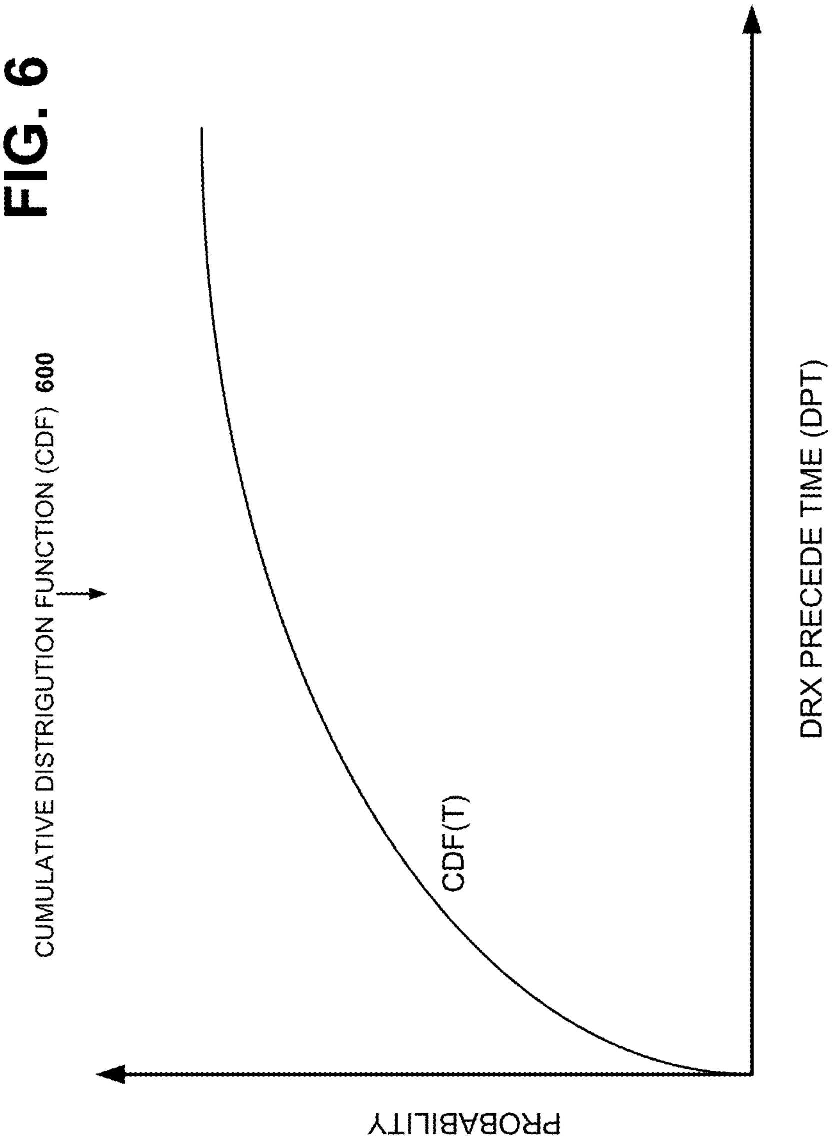
FIG. 6 illustrates an exemplary cumulative distribution function (CDF) of DPT, according to an implementation.

FIG. 6 illustrates an exemplary cumulative distribution function (CDF) 600 for acquiring the Wi-Fi® channel at various DPTs, according to an implementation. The data of FIG. 6 may be obtained by reorganizing data of graphs of FIG. 5 for different probabilities of acquisition. Depending on the implementation, reservation unit 316 may use the tabular format of graphs of FIG. 6 rather than the tabular format of graphs of FIG. 5 to obtain the DPT. As shown, as DPT increases, there is a greater probability of Wi-Fi® channel acquisition. As DPT increases, gateway device 300 has more opportunities to transmit RTS messages to avoid a collision and acquire the channel. As also shown, as DPT becomes large, the probability of channel acquisition moves toward an asymptotic value.

Returning to FIG. 3B, in some implementations, reservation unit 316 may use machine learning unit 318 to determine a DPT. Machine learning unit 318 may model DPT as a random variable—a model of the probability of channel acquisition as a function of DPT. In one implementation, machine learning unit 318 may use the model in which gateway device 300 applies the binary exponential back-off algorithm to change the size of its contention window when collisions occur between the RTSs messages transmitted from gateway device 300 and other Wi-Fi® devices.

In the model, if a size of the contention window is x, then the probability of channel acquisition can be denoted as $k_{1x}$, where $k_i$ is a constant. If a collision occurs, then the window is enlarged, and the next probability of channel acquisition can be denoted as $k_2x^2$, assuming that the window size is doubled, in accordance with the binary exponential back-off algorithm. Accounting for additional possible RTS collisions leads to the expression:

$$\text{Probability of Channel Acquisition} = k_1x + k_2x^2 + \ldots\ k_nx^n, \tag{1}$$

$$DPT = x + x^2 + \ldots x^n \tag{2}$$

In expressions (1) and (2), x, $x^2 \ldots x^n$ represent consecutive contention window sizes. It is assumed that the Wi-Fi® channel acquisition occurs at an on time of CDRX.

Machine learning unit 318 can collect the probabilities as function of DPTs for different congestion levels from Wi-Fi® monitor 314. The probability data can then be used to setup linear equations to compute $k_i$'s that minimize the least squares error. That is, machine learning unit 318 can be trained, based on collected data, to obtain $k_i$'s e that provide the best estimates of the probabilities. After machine learning unit 318 is trained, machine learning unit 318 can use, for a given congestion level and a desired probability, expression (1) to determine n. Given n, machine learning unit 318 can compute a DPT by applying expression (2).

Figure 7:
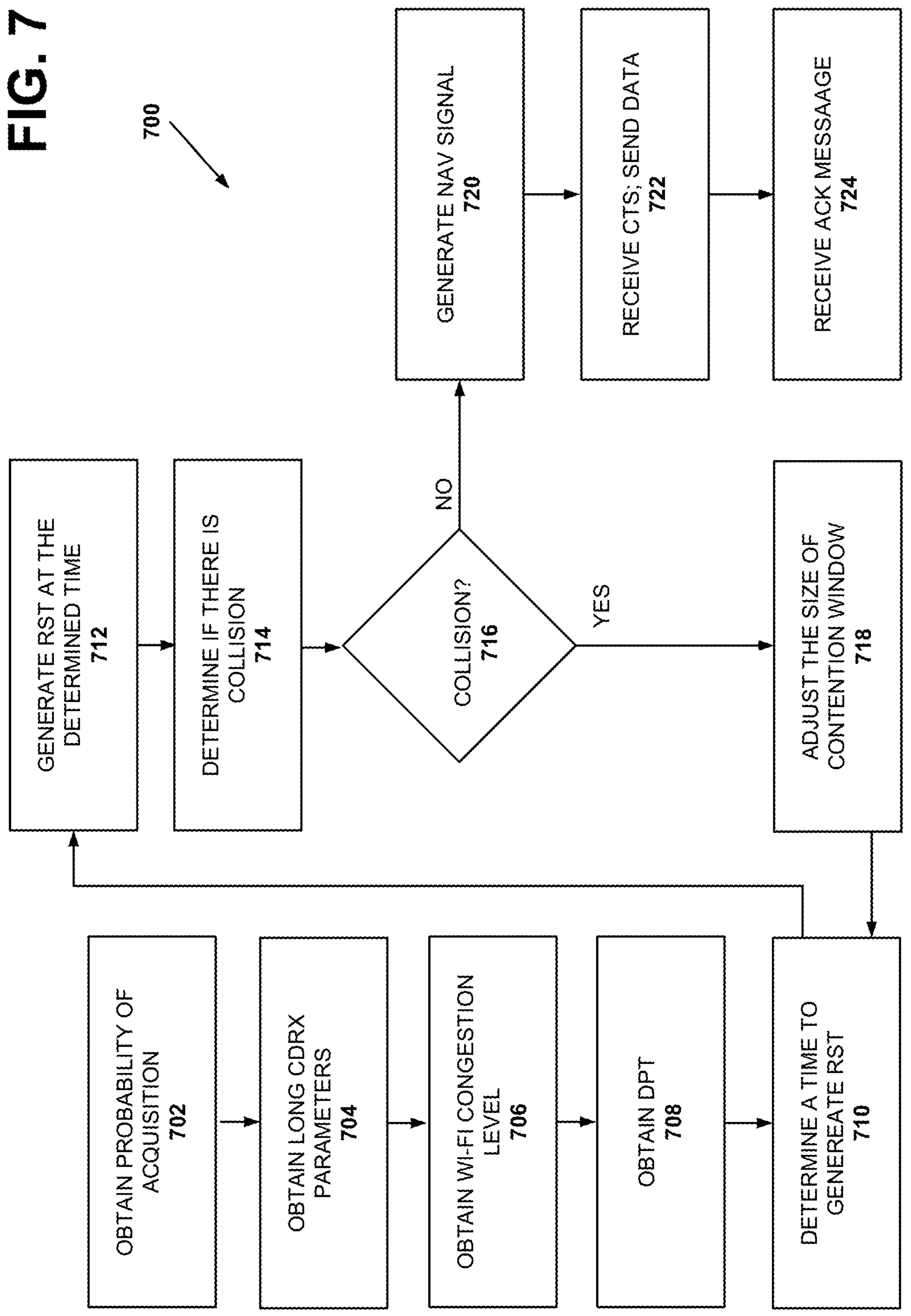
FIG. 7 is a flow diagram of an exemplary process for synchronizing Wi-Fi® signals to long CDRX cycles, according to an implementation.

FIG. 7 is a flow diagram of an exemplary process 700 for synchronizing Wi-Fi® signals to long CDRX cycles. Process 700 may be performed by gateway device 300 and/or UEs 106. Assume that gateway device 300 is in the RRC connected state and that gateway device 300 is configured to operate in accordance with long CDRX cycles. As shown, process 700 may include gateway device 300 obtaining the probability of Wi-Fi® channel acquisition (block 702). For example, gateway device 300 may retrieve a default probability.

Process 700 may further include obtaining long CDRX parameters (block 704). For example, reservation unit 316 may obtain long CDRX parameters from DRX monitor 312. DRX monitor 312 may provide many CDRX parameters, one of which is identified by reservation unit 316 as a next on time of a long CDRX. Furthermore, reservation unit 316 obtain the current congestion level of the Wi-Fi® network (block 706). Reservation unit 316, for example, may request Wi-Fi® monitor 314 for the parameter. Wi-Fi® monitor 314 may in turn query Wi-Fi® interface 304 for the value of the current level of traffic and the channel capacity, to derive the congestion level in terms of channel occupancy.

Process 700 may further include gateway device 300 obtaining a DPT that is likely to acquire the Wi-Fi® channel with the obtained probability and at the current congestion level (block 708). For example, reservation unit 316 may look up a DPT for the specified probability and congestion level in its tables of DPTs, probabilities, and congestion levels. Alternatively, machine learning unit 318 may compute the DPT ay using the congestion level to look up k's (computed during learning phases of machine learning unit 318) and then apply expression (1) to obtain the value of n. Machine learning unit 318 may then apply expression (2) to obtain the value of DPT. Machine learning unit 318 may provide the obtained DPT to reservation unit 316.

Process 700 may further include reservation unit 316 determining a time at which gateway device 300 should transmit an RST message (block 710) based on the DPT and the next on time of CDRX cycles. For example, in one implementation, the time to issue the RST message may be equal to the next on time of the long CDRX minus the determined DPT. Thereafter, synchronization logic 304 may request Wi-Fi® interface 306 to transmit the RST at the determined time (block 712).

Process 700 may further include Wi-Fi® interface 306 determining whether the RST collides with another transmission from different Wi-Fi® devices (block 714). If there is a collision (block 716: YES), Wi-Fi® interface 306 may adjust its contention window (block 718). For example, in one implementation, Wi-Fi® interface 306 may apply the binary exponential back-off algorithm to double the size of its contention window. Process 700 may then return to block 710, to repeat blocks 710-716 to try to acquire the Wi-Fi® channel. At block 718, however, if Wi-Fi® interface 306 does not detect a collision (block 718: NO), Wi-Fi® interface may conclude that the Wi-Fi® channel is successfully acquired and generate a NAV signal (block 720), causing other devices in the Wi-Fi® network to deter their transmissions until the end of NAV signal, or until their NAV timers expire.

Process 700 may further include Wi-Fi® interface 306 receiving a CTS message (block 722) from the UE 106 to which the RTS message from gateway device 300 was addressed. After the receipt of the CTS message, Wi-Fi® interface 306 may send data (block 722). When Wi-Fi® interface 306 finishes sending the data, Wi-Fi® interface 306 may stop transmitting the NAV signal. Wi-Fi® interface 306 may then receive an ACK message (block 724) from the UE 106 to which gateway device 300 send its data.

Figure 8:
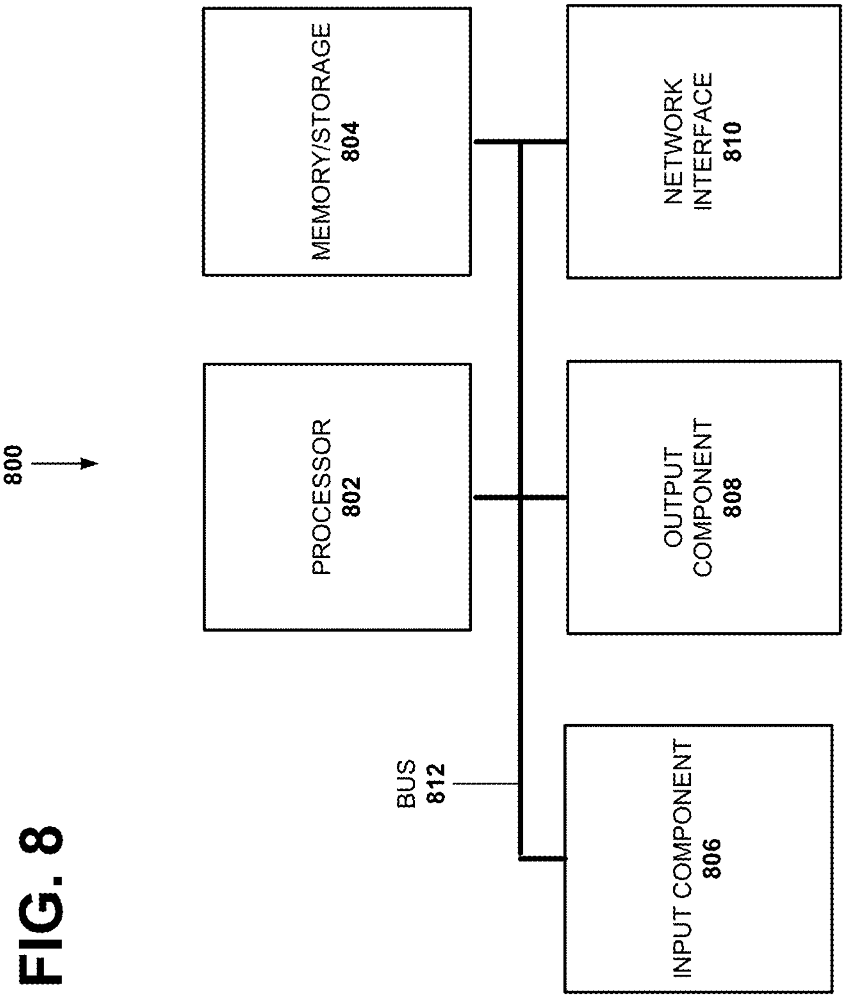
FIG. 8 is a block diagram illustrating exemplary components of a network device.

FIG. 8 depicts exemplary components of an exemplary network device 800. Network device 800 corresponds to or is included in devices 106, FWA 108, routers, switches, and/or any of the network components of FIGS. 1, 2, 3A and 3B. As shown, network device 800 includes a processor 802, memory/storage 804, input component 806, output component 808, network interface 810, and bus 812. In different implementations, network device 800 may include additional, fewer, different components than the ones illustrated in FIG. 8.

Processor 802 may include a processor, a microprocessor, an Application Specific Integrated Circuit (ASIC), a Field Programmable Gate Array (FPGA), a programmable logic device, a chipset, an application specific instruction-set processor (ASIP), a system-on-chip (SoC), a central processing unit (CPU) (e.g., one or multiple cores), a microcontroller, and/or another processing logic device (e.g., embedded device) capable of controlling network device 800 and/or executing programs/instructions.

Memory/storage 804 may include static memory, such as read only memory (ROM), and/or dynamic memory, such as random access memory (RAM), or onboard cache, for storing data and machine-readable instructions (e.g., programs, scripts, etc.).

Memory/storage 804 may also include a CD ROM, CD read/write (R/W) disk, optical disk, magnetic disk, solid state disk, holographic versatile disk (HVD), digital versatile disk (DVD), and/or flash memory, as well as other types of storage device (e.g., Micro-Electromechanical system (MEMS)-based storage medium) for storing data and/or machine-readable instructions (e.g., a program, script, etc.). Memory/storage 804 may be external to and/or removable from network device 800. Memory/storage 804 may include, for example, a Universal Serial Bus (USB) memory stick, a dongle, a hard disk, off-line storage, a Blu-Ray® disk (BD), etc. Depending on the context, the term "memory," "storage," "storage device," "storage unit," and/or "medium" may be used interchangeably. For example, a "computer-readable storage device" or "computer-readable medium" may refer to both a memory and/or storage device.

Input component 806 and output component 808 may provide input and output from/to a user to/from network device 800. Input and output components 806 and 808 may include, for example, a display screen, a keyboard, a mouse, a speaker, actuators, sensors, gyroscope, accelerometer, a microphone, a camera, a DVD reader, Universal Serial Bus (USB) lines, and/or other types of components for obtaining, from physical events or phenomena, to and/or from signals that pertain to network device 800.

Network interface 810 may include a transceiver (e.g., a transmitter and a receiver) for network device 800 to communicate with other devices and/or systems. For example, via network interface 810, network device 800 may communicate with access station 210. Network interface 810 may include an Ethernet interface to a LAN, and/or an interface/connection for connecting network device 800 to other devices (e.g., a Bluetooth interface). For example, network interface 810 may include a wireless modem for modulation and demodulation.

Bus 812 may enable components of network device 800 to communicate with one another.

Network device 800 may perform the operations described herein in response to processor 802 executing software instructions stored in a non-transient computer-readable medium, such as memory/storage 804. The software instructions may be read into memory/storage 804 from another computer-readable medium or from another device via network interface 810. The software instructions stored in memory or storage (e.g., memory/storage 804, when executed by processor 802, may cause processor 802 to perform processes that are described herein. For example, UE 106 and FWA 108 each include various programs for performing some of the above-described functions and processes.

In this specification, various preferred embodiments have been described with reference to the accompanying drawings. Modifications may be made thereto, and additional embodiments may be implemented, without departing from the broader scope of the invention as set forth in the claims that follow. The specification and drawings are accordingly to be regarded in an illustrative rather than restrictive sense. For example, while a series of blocks have been described above with regard to the process illustrated in FIG. 7, the order of the blocks may be modified in other implementations. In addition, non-dependent blocks may represent actions can be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

To the extent the aforementioned embodiments collect, store, or employ personal information provided by individuals, it should be understood that such information shall be collected, stored, and used in accordance with all applicable laws concerning protection of personal information. The collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, block, or instruction used in the present application should be construed as critical or essential to the implementations described herein unless explicitly described as such. Also, as used herein, the articles "a," "an," and "the" are intended to include one or more items. Further, the phrase "based on" is intended to mean "based, at least in part, on" unless explicitly stated otherwise.

What is claimed is:

1. A system comprising:

a memory; and a processor configured to:

determine a next active period, for a mobile terminal, within a Discontinuous Reception (DRX) cycle of the mobile terminal, wherein when determining the next active period, the processor is configured to determine an on time for the next active period; and synchronize an interval of time, for transmission or reception of data at a Wi-Fi® device, to the next active period within the DRX cycle of the mobile terminal, wherein when the processor synchronizes the interval of time to the next active period, the processor is configured to:

determine a time for transmitting a Request to Send (RTS) message based on the on time, a Wi-Fi® network congestion level, and a probability of acquiring a channel of the Wi-Fi® network; and cause the Wi-Fi® device to transmit the RTS message prior to an occurrence of the active period within the DRX cycle.

2. The system of claim 1, wherein when the processor determines the next active period, the processor is configured to:

determine an on duration of a long connected-mode DRX (CDRX) cycle.

3. The system of claim 1, wherein the Wi-Fi® device includes at least one of:

a wireless router; or customer premises equipment (CPE).

4. The system of claim 1, wherein when the processor determines the time for transmitting the RTS message, the processor is configured to:

obtain the time for transmitting the RTS message by subtracting a DRX precede time from the on time, wherein the DRX precede time includes an amount of time that is expected to elapse, after the Wi-Fi® device transmits the RTS message and before the Wi-Fi® device acquires the channel.

5. The system of claim 4, wherein the processor is further configured to determine the DRX precede time, wherein when determining, the processor is configured to compute the DRX precede time for the probability of acquiring the Wi-Fi® channel at the Wi-Fi® network congestion level, by evaluating a polynomial that models an algorithm for increasing a size of a contention window of the Wi-Fi® device, in response to a collision of the RTS message.

6. The system of claim 5, wherein the algorithm includes a binary exponential back-off algorithm.

7. The system of claim 1, wherein when the processor determines the next active period, the processor is configured to determine an on duration of a long connected-mode DRX (CDRX) cycle, and wherein the Wi-Fi® device includes at least one of:

a wireless router; or customer premises equipment (CPE).

8. A method comprising:

determining a next active period, for a mobile terminal, within a Discontinuous Reception (DRX) cycle, wherein determining the next active period comprises determining an on time for the next active period; and synchronizing an interval of time, for transmission or reception of data at a Wi-Fi® device, to the next active period within the DRX cycle of the mobile terminal, wherein when synchronizing the interval of time to the next active period comprises:

determining a time for transmitting a Request to Send (RTS) message based on the on time, a Wi-Fi® network congestion level, and a probability of acquiring a channel of the Wi-Fi® network; and causing the Wi-Fi® device to transmit the RTS message prior to an occurrence of the active period within the DRX cycle.

9. The method of claim 8, wherein determining the next active period includes:

determining an on duration of a long connected-mode DRX (CDRX) cycle.

10. The method of claim 8, wherein the Wi-Fi® device includes at least one of:

a wireless router; or customer premises equipment (CPE).

11. The method of claim 8, wherein determining the time for transmitting the RTS message includes:

obtaining the time for transmitting the RTS message by subtracting a DRX precede time from the on time, wherein the DRX precede time includes an amount of time that is expected to elapse, after the Wi-Fi® device transmits the RTS message and before the Wi-Fi® device acquires the channel.

12. The method of claim 11, further comprising:

determining the DRX precede time that includes:

computing the DRX precede time for the probability of acquiring the Wi-Fi® channel at the Wi-Fi® network congestion level, by evaluating a polynomial that models an algorithm for increasing a size of a contention window of the Wi-Fi® device, in response to a collision of the RTS message.

13. The method of claim 12, wherein the algorithm includes a binary exponential back-off algorithm.

14. The method of claim 8, wherein when determining the next active period includes determining an on duration of a long connected-mode DRX (CDRX) cycle, and wherein the Wi-Fi® device includes at least one of:

a wireless router; or customer premises equipment (CPE).

15. A non-transitory computer-readable medium comprising processor executable instructions, which when executed by a processor, cause the processor to:

determine a next active period, for a mobile terminal, within a Discontinuous Reception (DRX) cycle of the mobile terminal, wherein when determining the next active period, the processor is configured to determine an on time for the next active period; and synchronize an interval of time, for transmission or reception of data at a Wi-Fi® device, to the next active period within the DRX cycle of the mobile terminal, wherein when the processor synchronizes the interval of time to the next active period, the processor is configured to:

determine a time for transmitting a Request to Send (RTS) message based on the on time, a Wi-Fi® network congestion level, and a probability of acquiring a channel of the Wi-Fi® network; and cause the Wi-Fi® device to transmit the RTS message prior to an occurrence of the active period within the DRX cycle.

16. The non-transitory computer-readable medium of claim 15, wherein when the processor determines the next active period, the instructions cause the processor to:

determine an on duration of a long connected-mode DRX (CDRX) cycle.

17. The non-transitory computer-readable medium of claim 15, wherein the Wi-Fi® device includes at least one of:

a wireless router; or customer premises equipment (CPE).

18. The non-transitory computer-readable medium of claim 15, wherein when determining the time for transmitting the RTS message, the processor is configured to:

obtain the time for transmitting the RTS message by subtracting a DRX precede time from the on time, wherein the DRX precede time includes an amount of time that is expected to elapse, after the Wi-Fi® device transmits the RTS message and before the Wi-Fi® device acquires the channel.

19. The non-transitory computer-readable medium of claim 18, wherein the processor is further to:

determine the DRX precede time, wherein when determining, the processor is configured to compute the DRX precede time for the probability of acquiring the Wi-Fi® channel at the Wi-Fi® network congestion level, by evaluating a polynomial that models an algorithm for increasing a size of a contention window of the Wi-Fi® device, in response to a collision of the RTS message.

20. The non-transitory computer-readable medium of claim 19, wherein the algorithm includes a binary exponential back-off algorithm.

* * * * *